United States Patent
Higasa et al.

(10) Patent No.: US 8,163,120 B2
(45) Date of Patent: Apr. 24, 2012

(54) ADHESIVE FOR PRODUCTION OF IC CARD, PROCESS FOR PRODUCING IC CARD, AND IC CARD

(75) Inventors: Koichiro Higasa, Yokkaichi (JP); Yoshinori Ito, Yokkaichi (JP); Masahiko Oota, Yokkaichi (JP); Yoshinori Igarashi, Yokkaichi (JP)

(73) Assignee: Emulsion Technology Co., Ltd., Mie (JP)

( * ) Notice: Subject to any disclaimer, the term of this patent is extended or adjusted under 35 U.S.C. 154(b) by 937 days.

(21) Appl. No.: 11/883,132

(22) PCT Filed: Jan. 26, 2006

(86) PCT No.: PCT/JP2006/001230
§ 371 (c)(1),
(2), (4) Date: Jul. 26, 2007

(87) PCT Pub. No.: WO2006/080400
PCT Pub. Date: Aug. 3, 2006

(65) Prior Publication Data
US 2008/0102268 A1    May 1, 2008

(30) Foreign Application Priority Data
Jan. 28, 2005  (JP) .................................. 2005-021690

(51) Int. Cl.
*B29C 65/00*  (2006.01)
(52) U.S. Cl. ..................................... 156/250; 156/331.7

(58) Field of Classification Search .................. 428/334, 428/335, 339, 423.1; 156/331.1, 331.7, 250
See application file for complete search history.

(56) References Cited

U.S. PATENT DOCUMENTS

| | | | | |
|---|---|---|---|---|
| 4,726,868 | A * | 2/1988 | Goel et al. | 156/307.3 |
| 5,667,896 | A * | 9/1997 | Carter et al. | 428/425.6 |
| 6,098,889 | A * | 8/2000 | Ogawa et al. | 235/492 |
| 7,021,550 | B2 * | 4/2006 | Uchihiro et al. | 235/492 |
| 7,147,746 | B2 * | 12/2006 | Uchihiro et al. | 156/325 |
| 2003/0205399 | A1 * | 11/2003 | Uchihiro et al. | 174/52.4 |
| 2003/0234294 | A1 * | 12/2003 | Uchihiro et al. | 235/492 |

FOREIGN PATENT DOCUMENTS

| | | |
|---|---|---|
| CN | 1222116 | 7/1999 |
| JP | 03-029207 | 2/1991 |
| JP | 05-016583 | 1/1993 |
| JP | 07-156582 | 6/1995 |
| JP | 08-185498 | 7/1996 |
| JP | 11-216973 | 8/1999 |

(Continued)

*Primary Examiner* — Thao T. Tran
(74) *Attorney, Agent, or Firm* — Ditthavong Mori & Steiner, P.C.

(57) ABSTRACT

A process for producing an IC card comprising: an application/bonding step of applying an adhesive having a curing rate ratio (80° C./40° C.) of 30 or more on the surface of an inlet film, on which a number of IC modules are mounted, and/or a skin film for covering at least one surface of the inlet film, and bonding the inlet film and the skin film together to form a laminate film; a curing step of curing the adhesive to form a cured resin layer between the inlet film and the skin film of the laminate film; and a card forming step of forming a number of IC cards by dividing the laminate film for each IC module.

12 Claims, 2 Drawing Sheets

FOREIGN PATENT DOCUMENTS

| | | |
|---|---|---|
| JP | 11-296914 | 10/1999 |
| JP | 2000-194814 | 7/2000 |
| JP | 2000-242757 | 9/2000 |
| JP | 2001-184476 | 7/2001 |
| JP | 2001-216492 | 8/2001 |
| JP | 2002003811 A * | 1/2002 |
| JP | 2003-047910 | 2/2003 |
| JP | 2003-162697 | 6/2003 |
| JP | 2003-285403 | 7/2003 |
| JP | 2003-242475 | 8/2003 |
| JP | 2005-007695 | 1/2005 |

* cited by examiner

ADHESIVE FOR PRODUCTION OF IC CARD, PROCESS FOR PRODUCING IC CARD, AND IC CARD

TECHNICAL FIELD

The present invention relates to a process for producing an IC card, in which an IC module having an IC chip and an antenna is mounted on a film. More specifically, the present invention relates to an adhesive for producing an IC card, a process for producing an IC card, and an IC card.

BACKGROUND ART

An IC card is a card in which an IC module having an IC chip and an antenna is mounted on a film. When compared to a magnetic card which has been generally used, the IC card can transmit information quicker and easier, and is more secure against forgery and alteration. Therefore, the IC card is being used increasingly in various fields such as transportation (e.g., automatic ticket gates at train stations and electronic toll collection at expressways) and identification (e.g., membership cards and registration cards), not to mention finance (e.g., credit cards and ATM cards).

One known process for producing an IC card is a process for obtaining a number of IC cards by bonding a skin film to an inlet film, on which a number of IC modules having an IC chip and an antenna are mounted, with an adhesive to form a laminate film, and dividing the laminate film for each IC module (see Patent Document 1).

As the adhesive, a hot melt film adhesive (see Patent Document 2), a hot melt adhesive (Patent Document 3), a one-component moisture curable adhesive (see Patent Document 4), a UV curable adhesive (see Patent Document 5), a two-component adhesive (see Patent Document 6), and the like are disclosed.

Patent document 1: JP-A-2000-194814
Patent document 2: JP-A-2003-285403
Patent document 3: JP-A-2001-216492
Patent document 4: JP-A-7-156582
Patent document 5: JP-A-2001-184476
Patent document 6: JP-A-8-185498

DISCLOSURE OF THE INVENTION

The hot melt film adhesive disclosed in Patent Document 2 and the hot melt adhesive disclosed in Patent Document 3 show quick adhesion, and are suitable for continuous application since the adhesives are one-component adhesives. However, the temperature of the laminate film must be higher than the melting temperature of these adhesives (normally over 100° C.) in order to prevent protrusions of the inlet film, on which the IC chips and antennas are mounted, from causing unevenness of the skin film. These adhesives have been considered unsatisfactory, because the IC chips are vulnerable to heat and may be affected.

The one-component moisture curable adhesive disclosed in Patent Document 4, the UV curable adhesive disclosed in Patent Document 5, and the two-component adhesive disclosed in Patent Document 6 can be cured at a lower temperature (20 to 40° C.) than a hot melt adhesive. However, the one-component moisture curable adhesive is not suitable for production of an IC card for the following reasons. Since the one-component moisture curable adhesive is cured by reacting with water molecules in air, the one-component moisture curable adhesive is easily affected by seasonal change, the material of the surface, or the thickness of the surface. Thus, it has been difficult to realize a stable production. The UV curable adhesive is not suitable for production of an IC card, because the UV curable adhesive can be cured quickly only when a transparent film is used.

The two-component adhesive is free of these problems with the one-component moisture curable adhesive and the UV curable adhesive. However, due to unintended adhesion, accumulation, and coating of the two-component adhesive on an application device such as a coater, the application device must be dismantled and washed regularly. Therefore, it has been difficult to realize continuous application over a long period of time, and an improvement has been awaited.

As described above, an adhesive for producing an IC card or a process for producing an IC card which effectively prevents degradation and damage of an IC chip caused by a high temperature, and which enables continuous application of the adhesive over a long period of time has not been disclosed. Such an adhesive or a production process has been highly desired in the industry.

The present invention has been made to solve the above problems, and provides an adhesive for producing an IC card, a process for producing an IC card, and an IC card using the adhesive and the process, which can effectively prevent degradation and damage of an IC chip caused by a high temperature, and which enable continuous application of the adhesive over a long period of time.

The inventors of the present invention have conducted intensive studies to solve the above problems, and have found that the above problems can be solved by using an adhesive having a ratio of the curing rate at 80° C. to the curing rate at 40° C. (curing rate ratio (80° C./40° C.)) of a predetermined value or more. The finding has led to the completion of the present invention. Specifically, the present invention provides the Adhesive for producing an IC card, the process for producing an IC card, and the IC card described below.

[1] An adhesive for producing an IC card having cure rate ratio (80° C./40° C.) of 30 or more.

[2] The adhesive according to [1], wherein the adhesive is a two-component urethane adhesive.

[3] The adhesive according to [1] or [2], wherein the curing time at 80° C. is 2.7 minutes or shorter.

[4] The adhesive according to any one of [1] to [3], wherein the Shore hardness D of 51 or more and 85 or less.

[5] A process for producing an IC card comprising: an application/bonding step of providing an inlet film, on which a number of IC modules having an IC chip and an antenna are mounted, and a skin film for covering at least one surface of the inlet film, applying an adhesive having a curing rate ratio (80° C./40° C.) of 30 or more to the surface of the inlet film and/or the surface of the skin film, and bonding the inlet film and the skin film together to form a laminate film; a curing step of curing the applied adhesive to form a cured resin layer between the inlet film and the skin film of the laminate film; and a card forming step of dividing the laminate film for each IC module to obtain a number of IC cards.

[6] The process according to [5], wherein the application/bonding step is performed continuously by using a long film as the inlet film and as the skin film.

[7] The process according to [5] or [6], wherein a two-component urethane adhesive is used as the adhesive.

[8] The process according to any one of [5] to [7], wherein an adhesive of which the curing time at 80° C. is 2.7 minutes or shorter is used as the adhesive.

[9] The process according to any one of [5] to [8], wherein the curing step is performed under a temperature condition of 60° C. to 100° C.

[10] The process according to any one of [5] to [9], wherein an adhesive having a Shore hardness D of 51 or more and 85 or less is used as the adhesive.

[11] The process according to any one of [5] to [10], wherein the inlet film and the skin film are bonded together by supplying the adhesive from a multiple-head nozzle so that the adhesive is applied in plural strips to the surface of the inlet film and/or the skin film, laminating the inlet film and the skin film, and spreading the strips of the applied adhesive by pressing the films.

[12] The process according to any one of [5] to [10], wherein the inlet film and the skin film are bonded together by supplying the adhesive from a slit nozzle so that the adhesive is applied in one or more bands to the surface of the inlet film and/or the skin film, laminating the inlet film and the skin film, and spreading the strip of the applied adhesive by pressing the films.

[13] An IC card comprising: an IC module mounted film on which an IC module having an IC chip and an antenna is mounted; a skin film which covers at least one surface of the IC module mounted film; and a cured resin layer which bonds the IC module mounted film and the skin film together; wherein the cured resin layer is formed by curing an adhesive which has a curing rate ratio (80° C./40° C.) of 30 or more.

[14] The IC card according to [13], wherein the cured resin layer has a Shore hardness D of 51 or more and 85 or less.

[15] The IC card according to [13] or [14], wherein the cured resin layer has a thickness of 50 to 300 μm.

The Adhesive for producing an IC card and the process for producing an IC card according to the present invention can effectively prevent degradation and damage of an IC chip caused by a high temperature, and enable continuous application of the adhesive over a long period of time. Thus, the maintenance performance of an application device can be improved.

EXPLANATION OF SYMBOLS

10: adhesive, 12: inlet film, 14: skin film, 16: nozzle, 16A: multiple-head nozzle, 16B: slit nozzle, 18: roll, 32: skin film, 34: adhesive layer, 36: intermediate film

BEST MODE FOR CARRYING OUT THE INVENTION

Preferred embodiments of the process for producing an IC card and the IC card according to the present invention will be described below in detail. The present invention involves various embodiments including specific features of the present invention. Therefore, the present invention is not limited to the following embodiments.

[1] An Adhesive for Producing an IC Card:

The adhesive according to the present invention is an adhesive for producing an IC card having a curing rate ratio (80° C./40° C.) of 30 or more. An adhesive having such a curing rate ratio cures extremely slowly at room temperature, but cures quickly when the curing reaction is accelerated by a rise in temperature. Therefore, the adhesive may be continuously applied for longer than 8 hours, which is the general operating time of a factory. When such an adhesive is used, detaching and washing a nozzle once a day after work is sufficient for maintenance of an application device. Thus, the maintenance performance of the application device can be improved without affecting the productivity. Further, since the adhesive has a sufficiently high curing rate at a temperature of 100° C. or less (80° C., for example), degradation and damage of the IC chip due to high temperature can be prevented.

The term "An adhesive for producing an IC card" in this description refers to an adhesive for bonding an inlet film and a skin film. The term "curing rate ratio (80° C./40° C.)" of the adhesive refers to a ratio of the curing rate at 80° C. to the curing rate at 40° C. The curing rate ratio can be calculated from the curing time at 80° C. and the curing time at 40° C., which are actually measured under predetermined conditions. Specifically, the term "curing rate ratio (80° C./40° C.)" refers to a ratio of the curing time at 80° C. to the curing time at 40° C., which are obtained by measuring the required time for a torque to reach 1.0 kg·cm with the cure of the adhesive (curing time) at 40° C. and 80° C., respectively, using a Curastometer (produced by A&D Company, Ltd.), which is a test instrument for rubber vulcanization in compliance with the ISO 6502-1999, having a die configuration of the ISO 6502 flat plate die rotorless curemeter and an amplitude angle of ¼ degrees.

The adhesive used in the production process according to the present invention is not particularly limited as long as the curing rate ratio is at a value described above. It is preferable that a two-component urethane adhesive is used in the production process according to the present invention. This is because the two-component urethane adhesive is highly adhesive even when not under high temperature and high pressure conditions.

The two-component urethane adhesive composed a first component (base resin) having a polyisocyanate as a constituent component, and a second component having an active hydrogen compound and a catalyst as constituent components.

A polyisocyanate is a compound having a number of (preferably 2 to 3) isocyanate groups in the molecule. In the production process according to the present invention, the first component including various polyisocyanates such as an aliphatic, aromatic, and alicyclic polyisocyanate as a constituent component may suitably used.

As examples of the polyisocyanate, diisocyanate compounds such as xylylene diisocyanate, polypheynylmethane diisocyanate, 4,4'-diphenylmethane diisocyanate, isophorone diisocyanate, tolylene diisocyanate, hexamethylene diisocyanate, naphthalene diisocyanate, hydrogenerated diphenylmethane diisocyanate, hydrogenerated xylylene diisocyanate, and dicyclohexylmethane diisocyanate, and polymers thereof can be given. These polyisocyanates may be used either individually or in combination of two or more.

The polyisocyanate may be used as a prepolymer obtained by reaction of an active hydrogen compound such as a polyol or a polyamide (preferably a polyol) which will be described later. The molecular weight of the active hydrogen compound is preferably 10,000 or less, and more preferably 200 to 5,000.

As examples of the active hydrogen compound, polyols and polyamines can be given. Specific examples of the polyol include polyhydric alcohols such as ethylene glycol, propylene glycol, polyethylene glycol, polypropylene glycol, trimethylolpropane, diethylene glycol, triethylene glycol, hexamethylene glycol, glycerol, 1,3-buthylene glycol, 1,4-butanediol, hexanetriol, pentaerythritol, sorbitol, and neopentyl glycol; polyether polyols obtained by addition polymerization of a polyhydric alcohol and an alkylene oxide such as ethylene oxide and propylene oxide; polyester polyols obtained by condensation reaction of a polyhydric alcohol and a polybasic acid such as maleic acid, succinic acid, adipic acid, sebacic acid, tartaric acid, terephthalic acid, and isophthalic acid; polyester polyols obtained by ring-opening polymerization of a lactone such as ε-caprolactone and γ-valerolactone; acrylic polyols which are homopolymers of polymerizable monomers including a hydroxyl group such as hydroxyethyl acrylate, hydroxybutyl acrylate, and trimethylolpropane acrylic acid monoester, or copolymers thereof with copolymerizable monomers (acrylic acid, methacrylic acid, styrene, acrylonitrile, α-methylstyrene, and the like); castor oil or derivatives thereof; and epoxy polyols obtained by reaction of an epoxy resin, which has an epoxy group on each end, and monoethanolamine, diethanolamine, and the like.

Specific examples of the polyamine include aliphatic polyamines such as ethylenediamine, diethylenetriamine, triethylenetetramine, tetraethylenepentamine, pentaethylenehexamine, tetramethylenediamine, pentamethylenediamine, hexamethylenediamine, cyclohexylenediamine, isophoronediamine, dicyandiamide, acid hydrazide, aminimide, melamine, and derivatives thereof; and aromatic polyamines such as o-phenylenediamine, m-phenylenediamine, p-phenylenediamine, 4,4'-diaminodiphenylmethane, 4,4'-diaminodiphenylsulfone, 4,4'-diamino diphenyl ether, 2,4-diaminodiphenylamine, 1,5-diaminonaphthalene, 1,8-diaminonaphthalene, and 2,4-diaminotoluene.

The active hydrogen compound may be used either individually or in combination of two or more. For example, an active hydrogen compound having a molecular weight of 300 or less and an active hydrogen compound having a molecular weight of 1,000 or more may be preferably used in combination.

An adhesive of which a cured product has a Shore hardness D of 51 or more and 85 or less is preferably used in the production process of the present invention. By using an adhesive of which a cured product has a Shore hardness D of 51 or more and 85 or less, the card can be provided with an appropriate bending repulsion, thereby effectively preventing damage or of IC modules cracking of the card. If the Shore hardness D is below 51, the card is too soft and is easily bent. This may cause damage to the IC module. If the Shore hardness D is above 85, the card is excessively hardened, whereby the card may crack. Note that the term "Shore hardness D" refers to a hardness measured by the Shore hardness test described in JIS K6253. A commercially-available durometer (e.g., Asker Durometer Type D (produced by Kobunsha Keiki Co., Ltd.) and Durometer GS-720N (produced by Teclock)) can be used for measurement.

As examples of the adhesive having the properties described above, an epoxy adhesive, phenol adhesive, unsaturated polyester adhesive, urethane adhesive, and the like can be given. The urethane adhesive is preferably used in the production process according to the present invention, because the cured resin layer has a high flexibility and the card can be given an appropriate bending repulsion.

The curing rate ratio (80° C./40° C.) of the adhesive according to the present invention is 30 or more, and preferably 50 or more, so that the curing reaction is suppressed at room temperature and the curing speed is attained sufficiently at time of raising temperature. If the curing rate ratio (80° C./40° C.) is less than 30, it is difficult to continuously apply the adhesive for a long period of time (e.g., for 8 hours or longer), and a high temperature exceeding 100° C. is necessary for a sufficient cure. Thus, the IC chips may be degraded or damaged by the high temperature.

The curing time of the adhesive according to the present invention at 40° C. is preferably 81 minutes or longer, and more preferably 95 minutes or longer, so that the curing reaction is suppressed at room temperature. If the curing time at 40° C. is less than 81 minutes, it is difficult to continuously apply the adhesive for a long period of time (e.g., for 8 hours or longer) due to progress of the curing reaction at room temperature.

The curing time of the adhesive according to the present invention at 80° C. is preferably 2.7 minutes or shorter, and more preferably 2.5 minutes or shorter, so that a sufficient curing rate can be achieved at high temperature. If the curing time is longer than 2.7 minutes, a high temperature exceeding 100° C. is necessary for a sufficient cure, whereby the IC chip may be degraded or damaged by the high temperature. In addition, since the adhesive does not cure sufficiently at 100° C. or less (e.g., 80° C.), the cross section of an IC card may be smashed if the IC card is divided (cut) right after the bonding. Thus, the card shape may not turn out as desired.

Note that the curing rate ratio (80° C./40° C.) can be adjusted to 30 or more by appropriately controlling conditions such as the type or the added amount of a catalyst for accelerating the curing reaction.

Examples of the catalyst for a urethane adhesive include diazabicycloalkenes such as 1,4-diazabicyclo[2.2.2]octane (also referred to as "DABCO"), 1,8-diazabicyclo[5.4.0]undecene-7 (also referred to as "DBU"), octylate of 1,8-diazabicyclo[5.4.0]undecene-7 (also referred to as "DBU-C8), 6-(2-hydroxypropyl)-1,8-diazabicyclo[5.4.0]undecene-7 (also referred to as "DBU-OH"); organotins such as dibutyltin dilaurate; and tertiary amines such as triethylamine. The diazabicycloalkenes do not contain heavy metals, and therefore, are preferable also in terms of environmental protection. DBU, DBU salts such as DBU-C8, and DBU-OH highly accelerate the curing reaction in accordance with a change in temperature, and therefore, are suitably used in the production process according to the present invention.

The added amount of the catalyst is preferably 0.001 to 5 parts by mass, more preferably 0.03 to 2 parts by mass, and still more preferably 0.03 parts to 1 part by mass with respect to a total of 100 parts by mass of the polyisocyanate, active hydrogen compound (such as a polyol and a polyamine), and a coloring agent and an inorganic filler which will be described later. If the added amount is less than 0.001 part by mass, the effect of the catalyst may be insufficient. If the added amount is greater than 5 parts by mass, the gelled substance may become excessive in the adhesive, and the adhesive may not be discharged stably. Therefore, it may be difficult to continuously apply the adhesive for a long period of time. Further, the catalyst residue in the adhesive may affect the product to which the adhesive is applied.

The adhesive used in the production process according to the present invention may contain generally-used additives such as an organic or inorganic coloring agent and an inorganic filler (bulking agent). As examples of the organic or inorganic coloring agent, titanium dioxide and the like can be given. As examples of the inorganic filler, dry carbon black, silica plate, spherical glass particles, talc, clay, calcium carbonate, zinc oxide, and the like can be given.

[2] Process for Producing IC Card:

The production process according to the present invention includes an application/bonding step of applying an adhesive to the surface of an inlet film or the like and bonding the inlet film to a skin film to form a laminate film, a curing step of curing the applied adhesive to form a cured resin layer, and a card forming step of forming a number of IC cards by dividing the laminate film for each IC module. Each step will be described below.

[2-1] Application/Bonding Step:

In the application/bonding step, an adhesive is applied to the surface of the inlet film or the like, and the inlet film is bonded to the skin film to form a laminate film. The inlet film and the skin film are used as materials for producing an IC card in the production process according to the present invention.

[2-1A] Inlet Film:

The term "inlet film" in this description refers to a film on which a number of IC modules are mounted. The IC module includes an IC chip and an antenna coil.

As examples of the antenna, a coil antenna in which a metal wire is wound to form a coil, a substrate antenna in which an antenna pattern is formed on a print substrate, and the like can be given. The IC module necessarily includes an IC chip and an antenna, and may further include other members. As examples of such members, a capacitor, a resistor, and the like can be given. In general, the IC chip, the antenna, and other members are electrically connected by a conductive adhesive such as silver paste, copper paste, and carbon paste, or a conductor such as a bonding wire.

Considering that the application/bonding step is performed in a continuous manner, the inlet film is preferably a long film. The size of the long film is not particularly limited in the production method according to the present invention, but is preferably 300 to 1,000 mm in width and 10 m or longer in length.

A number of IC modules described above are mounted on an inlet film. The size of the IC card is about 54 mm×85 mm. If the size of the long film is about 400 mm in width and 10 m in length, 4 to 6° C. modules are suitably mounted in the width direction, and 100 to 110 IC modules are suitably mounted in the length direction.

The inlet film may have a configuration in which the IC module is mounted on one protection film, a configuration in which the IC module is placed in an adhesive layer between two protection films, and the like. The maximum thickness of the inlet film is approximately 50 to 400 μm.

Examples of the material for the protection film include polyester resins such as polyethylene terephthalate (PET), polybutylene terephthalate (PBT), and a polyethylene terephthalate/isophthalate copolymer; polyolephin resins such as polyethylene (PE), polypropylene (PP), and polymethylpentene; polyethylene fluoride resins such as polyvinyl fluoride, polyvinylidene fluoride, poly(4-fluoroethylene), and an ethylene/4-fluoroethylene copolymer; polyamides such as nylon 6 and nylon 6,6; vinyl polymers such as poly(vinyl chloride), a vinyl chloride/vinyl acetate copolymer, an ethylene/vinyl acetate copolymer, an ethylene/vinyl alcohol copolymer, polyvinyl alcohol, and vinylon; cellulose resins such as cellulose triacetate and cellophane; acrylic resins such as poly(methyl methacrylate), poly(ethyl methacrylate), poly(ethyl acrylate), and poly(butyl acrylate); synthetic resins such as polystyrene, polycarbonate, polyarylate, and polyimide; and single layered materials such as paper (e.g., fine quality paper, thin paper, glassine paper, and parchment paper), metal foil, fabric, and nonwoven fabric, or a laminate of two or more layers thereof materials. PET and PP may be preferably used. PET with controlled crystallinity (product name: PET-G, produced by Eastman Chemical Company) can easily be embossed, and may be suitably used when producing an IC card which requires embossing. The PET with controlled crystallinity is preferable also because the adhesive quality with respect to the inlet film is high.

[2-1B] Skin Film:

The skin film is a film which covers at least one surface of the inlet film. As the material used for the skin film, the same materials as those used for the protection film mentioned above may be used. PET, PP, and PET with controlled crystallinity may be preferably used as well.

Note that a film formed of PET, PP, and the like which are colored white by white pigments or bubbles may suitably be used as the skin film.

As in the case of the inlet film, the skin film is preferably a long film, considering that the application/bonding step is performed in a continuous manner. In this case, the size of the skin film must correspond to the size of the inlet film.

The thickness of the skin film is preferably about 50 to 150 μm. By using a skin film with such thickness, the IC card can be suitably embossed.

Note that the skin film covers at least one surface of the inlet film, and does not necessarily cover both front and back surfaces of the inlet film. Specifically, the IC card obtained by the production process according to the present invention may be a three-layered IC card in which both front and back surfaces of the inlet film are covered by the skin film, or a two-layered IC card in which one surface of the inlet film is covered by the skin film.

[2-1C] Adhesive:

The curing rate ratio (80° C./40° C.) of the adhesive for bonding the inlet film and the skin film must be 30 or more, and is preferably 50 or more. If the curing rate ratio (80° C./40° C.) is less than 30, it is difficult to continuously apply the adhesive for a long period of time (e.g., for 8 hours or longer), and a high temperature exceeding 100° C. is necessary for a sufficient cure. Thus, the IC chips may be degraded or damaged by the high temperature. Therefore, the adhesive for producing an IC card according to the present invention is preferably used in the production process according to the present invention.

[2-1D] Formation of Laminate Film:

The laminate film is formed by applying an adhesive, which has a curing rate ratio (80° C./40° C.) of 30 or more, to the surface of the inlet film and/or the skin film, and then bonding the inlet film and the skin film together.

In the production process according to the present invention, the adhesive is applied to the surface of the inlet film and/or the skin film. That is, the adhesive is applied to the surface of either the inlet film or the skin film, or to the surfaces of both the inlet film and the skin film.

In the production process according to the present invention, an adhesive having a curing rate ratio (80° C./40° C.) of 30 or more is used in order to improve the maintenance performance of an application device. However, with a general coater such as a roll coater or a comma coater for indirect coating, problems may occur such as adhesion and accumulation of the gradually cured adhesive on the coater. Thus, the adhesive may not be applied continuously for a long period of time.

Figure 1:
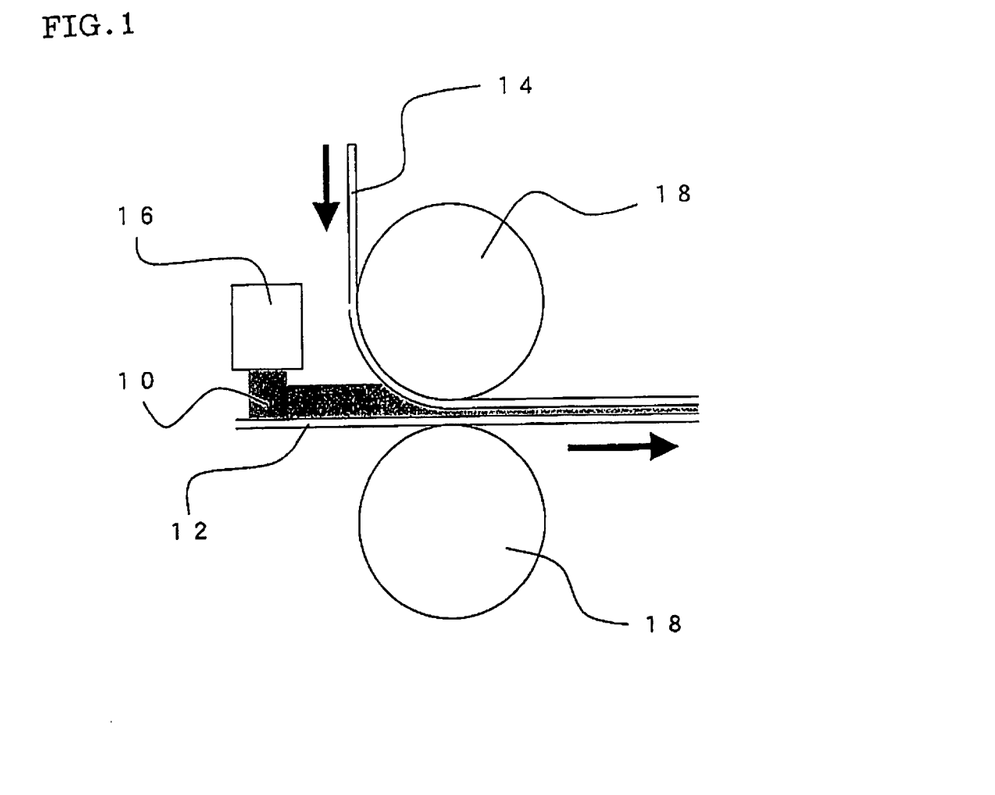
FIG. 1 is a schematic cross-sectional view showing a configuration example of a production device used in the production process according to the present invention.

In a preferred production process according to the present invention, as shown in FIG. 1, the adhesive 10 is directly applied to a part of the surface of the inlet film 12 and/or the skin film 14, and the films are laminated and pressed so that the adhesive 10 applied to a part of the surface(s) is spread, whereby the inlet film 12 and the skin film 14 are bonded together. Note that, in FIG. 1, reference numeral 16 indicates a nozzle for supplying the adhesive, and reference numeral 18 indicates a roll for pressing the film and spreading the adhesive.

To be more specific, the inlet film and the skin film are bonded together by supplying the adhesive from a multiple-head nozzle so that the adhesive is applied in plural strips to the surface of the inlet film and/or the skin film, laminating the inlet film and the skin film, and spreading the strips of the adhesive by pressing the films. With this process, clogging of a nozzle or the like can be more effectively prevented compared to a process for supplying the adhesive from a slit nozzle having a size corresponding to a film width so that the adhesive is applied to spread thinly on the entire surface of a film, and bonding the films together. Thus, the adhesive can be applied continuously over a long period of time.

Figure 2:
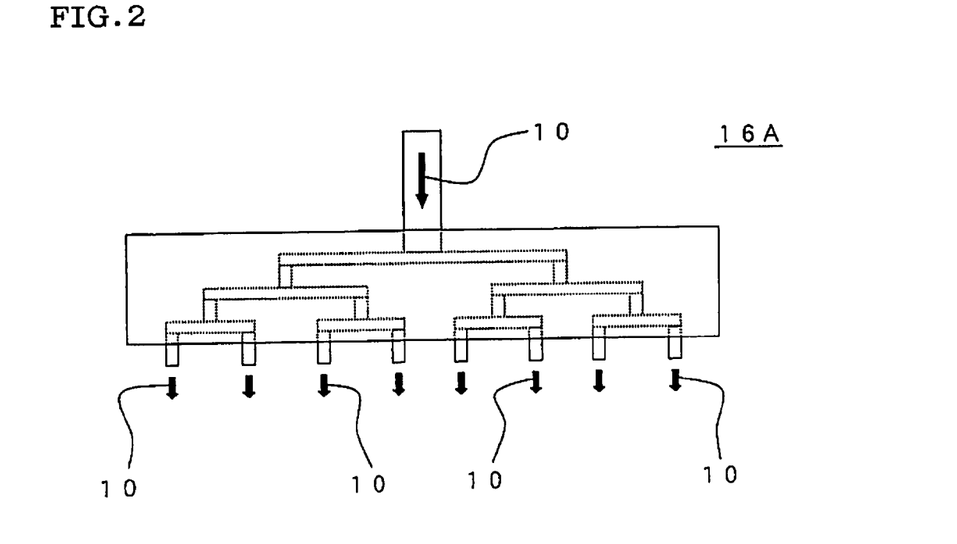
FIG. 2 is a schematic view showing a configuration example of a multiple-head nozzle used in the production process according to the present invention.

The term "multiple-head nozzle" in this description refers to a nozzle with a branched structure (e.g., a multiple-head nozzle 16A shown in FIG. 2) which is to be provided at the tip end of a discharge device of the adhesive 10. In the multiple-head nozzle 16A shown in FIG. 2, the path of the adhesive 10 supplied through a pipe by a pump of the discharge device diverges into two paths near the entrance. These paths diverge into two paths, respectively, and the resulting paths further diverge into two paths, respectively. Thus, the nozzle is called an "8-head nozzle". The number of heads of the multiple-head nozzle may be appropriately changed depending on the width of the sheet to be used, as long as the number is two or more. If the diameter of each nozzle head is too small, the discharge pressure increases due to large flow resistance, and the load applied to the pump of the discharge device increases. Therefore, the adhesive may not be discharged stably for a long period of time. If the diameter of the nozzle head is too large, the flow rate of the adhesive becomes too low, and aggregates of the adhesive tend to accumulate in the multiple-head nozzle. Therefore, the adhesive may not be discharged stably for a long period of time. Note that these phenomena correlate with the discharge amount of the adhesive. Thus, the diameter may be appropriately determined depending on the discharge amount of the adhesive. In other words, the diameter of the outlet of nozzle head is not particularly limited.

The same effect can be achieved by a process in which the inlet film and the skin film are bonded together by supplying the adhesive from a slit nozzle so that the adhesive is applied in one or more band to the surface of the inlet film and/or the skin film, laminating the inlet film and the skin film, and spreading the band(s) of the adhesive by pressing the films.

Figure 3:
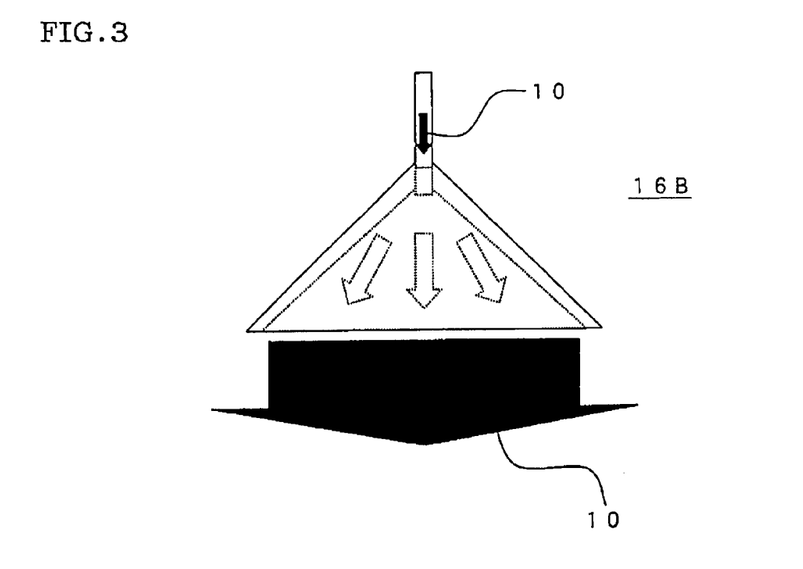
FIG. 3 is a schematic view showing a configuration example of a slit nozzle used in the production process according to the present invention.

The term "slit nozzle" in this description refers to a nozzle with a rectangular nozzle head (e.g., a slit nozzle 16B shown in FIG. 3) which is to be provided at the tip end of a discharge device of the adhesive 10. The slit nozzle is a nozzle which can discharge the adhesive in bands. The thickness of the discharged band of the adhesive can be determined by adjusting an opening of the rectangular discharging outlet of nozzle head. In the production process according to the present invention, the adhesive is applied to a part of a sheet, the sheet is laminated with another sheet, and the adhesive is spread by pressing the sheets. Thus, the band width of the applied adhesive may be smaller than the sheet width. Therefore, it is not required to use a slit nozzle having an extremely thin slit width which is required for a method of coating adhesive thinly over the whole surface of film, thereby the situation wherein a stable discharging is obstructed due to the clogging of the discharge outlet within a short period of time with the agglomerates formed within the internal portions of the nozzle can be effectively prevented. In the production process according to the present invention, the width of the applied adhesive is preferably 10% to 70% of the sheet width, and more preferably 20% to 50%.

[2-2] Curing Step:

The curing step is a step in which a cured resin layer is formed between the inlet film and the skin film of the laminate film by curing the adhesive. As examples of the curing step, a process for pressing the laminate film by a heat press plate for a predetermined time, a process for pressing the laminate film with a pair of parallel, caterpillar-shaped heat press plates for a predetermined time (see JP-A-2003-162697), a process for pressing the laminate film with a pair of parallel heated conveyor belts for a predetermined time, and the like can be given. The process for pressing the laminate film with a pair of parallel heated conveyor belts for a predetermined time is preferable, and is more preferable if the conveyor belt is made of metal.

In the production process according to the present invention, the curing step is performed at a temperature of preferably 60° C. to 100° C. If the temperature is below 60° C., the curing step takes more time, and the productivity decreases. If the temperature is over 100° C., the IC chip may be degraded or damaged by the high temperature, as in the case of a hot melt adhesive.

[2-3] Card Forming Step:

The card forming step is a step in which a number of IC cards are obtained by dividing the laminate film for each IC module.

In the production process according to the present invention, the process for dividing the laminate film is not particularly limited. As examples of the process, a process for cutting the laminate film to obtain a predetermined card size, a process for punching out the laminate film to obtain a predetermined card size, and the like can be given.

[3] IC Card:

The IC card according to the present invention includes an IC module mounted film in which an IC module having an IC chip and an antenna is mounted on a film, a skin film which covers at least one surface of the IC module mounted film, and a cured resin layer which bonds the IC module mounted film and the skin film together. The cured resin layer is formed by curing an adhesive which has a curing rate ratio (80° C./40° C.) of 30 or more. Since the cured resin layer is formed of an adhesive which can be applied continuously for a long period of time, the IC cards can be produced with high productivity. Since the adhesive forming the cured resin layer has a high curing rate at a temperature below 100° C. (80° C., for example), degradation and damage of the IC chip due to high temperature rarely occurs. Thus, the IC card is excellent in quality.

The term "IC module mounted film" refers to a film in which an IC module having an IC chip and an antenna is mounted on a film. The IC module mounted film is generally obtained by dividing an inlet film, on which a number of IC modules having an IC chip and an antenna are mounted, for each IC module.

The cured resin layer of the IC card according to the present invention preferably has a thickness of 50 to 300 μm in order to prevent damage to the IC module and cracking of the cured resin layer. If the thickness of the cured resin layer is less than 50 μm, the card is easily bent, and the IC module is more likely to be damaged. If the thickness is more than 300 μm, the cured resin layer is excessively hardened, and cracking may be caused.

The Shore hardness D of the IC card according to the present invention is preferably of 51 or more and 85 or less. Within this range, the card can be provided with an appropriate bending repulsion, whereby damage to the IC module and cracking of the card can be effectively prevented. If the Shore hardness D is below 51, the card is too soft and is easily bent. This may cause damage to the IC module, depending on the thickness of the skin film and the cured resin layer. If the Shore hardness D is above 85, the card is excessively hardened, and the card may crack.

EXAMPLES

The Adhesive for producing an IC card, the process for producing an IC card, and the IC card according to the present invention will be described below in detail by way of examples. Note that these examples represent some embodiments of the present invention, and should not be construed to limit the scope of the present invention.

The following polyisocyanate, polyether polyol, catalyst, and inorganic filler were used in the examples and the comparative examples.

(1) Polyisocyanate:
4,4'-Diphenylmethane diisocyanate polymer (product name: Sumidur 44V-20, NCO content: 31 mass %, average number of functional groups: 2.5, produced by Sumika Bayer Urethane Co., Ltd.)

(2) Polyether Polyol:
(A) Polypropylene glycol polyol having an average molecular weight of 2,000 (product name: Excenol 2020, average number of functional groups: 2, produced by Asahi Glass Co., Ltd.)
(B) Polypropylene glycol polyol having an average molecular weight of 5,000 (product name: Excenol 823, average number of functional groups: 3, produced by Asahi Glass Co., Ltd.)
(C) Polypropylene glycol polyol having an average molecular weight of 300 (product name: Uniol TG330, average number of functional groups: 3, produced by NOF Corporation)

(3) Catalyst:
(A) Dibutyltin dilaurate (product name: ADK STAB BT-11, produced by Asahi Denka Kogyo Co., Ltd., referred to as "organic tin" in the tables)
(B) 1,4-Diazabicyclo[2.2.2]octane (produced by Air Products Japan Inc., referred to as "DABCO" in the tables)
(C) 1,8-Diazabicyclo[5.4.0]undecene-7 (produced by San-Apro Limited, referred to as "DBU" in the tables)
(D) Octylate of 1,8-diazabicyclo[5.4.0]undecene-7 (product name: U-CAT SA 102, produced by San-Apro Limited, referred to as "DBU-C8" in the tables)
(E) 6-(2-Hydroxypropyl)-1,8-diazabicyclo[5.4.0]undecene-7 (produced by San-Apro Limited, referred to as "DBU-OH" in the tables)

(4) Inorganic Filler:
Calcium bicarbonate (product name: NS #100, produced by Nitto Funka Kogyo K.K.)

Preparation Example 1

A first component (base resin) of a two-component adhesive having a composition shown in Table 1 was prepared. Specifically, 43.56 parts by mass of the polyisocyanate was added to 11.44 parts by mass of the polyether polyol (A) and reacted at 90° C. for 2 hours to form a prepolymer. Then, 45 parts by mass of the inorganic filler was added and mixed. Thus, a composition (component A) having a composition shown in Table 1 was prepared. The NCO content of the component A was 13 mass %.

TABLE 1

| | | Preaparation Example 1 First component | Preaparation Example 2 | Preaparation Example 3 Second component | Preaparation Example 4 | Preaparation Example 5 |
|---|---|---|---|---|---|---|
| | | Component A | Component B | Component C | Component D | Component E |
| Polyisocyanate | (mass %) | 43.56 | — | — | — | — |
| Polyether polyol (A) | | 11.44 | — | — | — | — |
| Polyether polyol (B) | | — | 37 | 37 | 37 | 37 |
| Polyether polyol (C) | | — | 23 | 23 | 23 | 23 |
| Inorganic Filler | | 45 | 40 | 40 | 40 | 40 |
| Total | (mass %) | 100 | 100 | 100 | 100 | 100 |
| NCO content | (mass %) | 13 | — | — | — | — |
| Catalyst (A)/organic tin | (parts by mass) | — | 0.01 | — | — | — |
| Catalyst (B)/DABCO | | — | — | 0.1 | — | — |
| Catalyst (C)/DBU | | — | — | — | 0.07 | — |
| Catalyst (D)/DBU-C8 | | — | — | — | — | 0.1 |
| Catalyst (E)/DBU-OH | | — | — | — | — | — |

| | Preaparation Example 6 | Preaparation Example 7 | Preaparation Example 8 Second component | Preaparation Example 9 | Preaparation Example 10 |
|---|---|---|---|---|---|
| | Component F | Component G | Component H | Component I | Component J |
| Polyisocyanate | — | — | — | — | — |
| Polyether polyol (A) | — | — | — | — | — |
| Polyether polyol (B) | 37 | 44.75 | 40.87 | 23 | 9 |
| Polyether polyol (C) | 23 | 14.45 | 18.73 | 38.45 | 53.9 |
| Inorganic Filler | 40 | 40.8 | 40.4 | 38.55 | 37.1 |
| Total | 100 | 100 | 100 | 100 | 100 |
| NCO content | — | — | — | — | — |
| Catalyst (A)/organic tin | — | — | — | — | — |
| Catalyst (B)/DABCO | — | — | — | — | — |
| Catalyst (C)/DBU | — | 0.058 | 0.065 | 0.09 | 0.11 |
| Catalyst (D)/DBU-C8 | — | — | — | — | — |
| Catalyst (E)/DBU-OH | 0.07 | — | — | — | — |

Preparation Example 2

A second component (curing agent) of a two-component adhesive having a composition shown in Table 1 was prepared. Specifically, 23 parts by mass of the polyether polyol (C) and 40 parts by mass of the inorganic filler were added to 37 parts by mass of the polyether polyol (B). After the addition of 0.01 part by mass of the catalyst (A) to 100 parts by mass of the mixture, the components were mixed to prepare a composition (component B) having a composition shown in Table 1.

Preparation Examples 3 to 10

In the same manner as Preparation Example 2, a second components (curing agent) of a two-component adhesive having a composition shown in Table 1 was prepared to obtain a composition (components C to J).

Comparative Example 1

Figure 4:
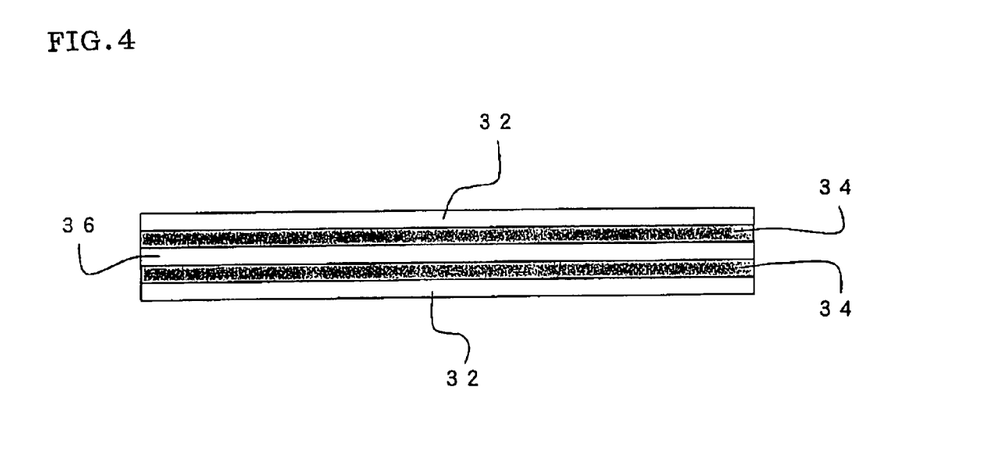
FIG. 4 is a schematic cross-sectional view showing a configuration of a laminate film produced in the example.

The first component (component A) and the second component (component B) of the two-component adhesive obtained as described above were mixed at a mass ratio of 100:100 to obtain an adhesive for producing an IC card. The Adhesive for producing an IC card, a skin film, and an intermediate film were used to form a laminate film, which is similar to an IC card, and the cutting properties and the bending resistance of the laminate film were evaluated. Specifically, a laminate film was obtained by laminating a skin film (formed of PET, thickness: 50 μm, 100 μm, 150 μm) and an intermediate film (formed of PET, thickness: 100 μm), as shown in FIG. 4, in the following order from the top; skin film 32, adhesive layer 34, intermediate film 36, adhesive layer 34, and skin film 32. The total thickness was adjusted to 0.74 to 0.78 mm, and the laminate film was sandwiched between two iron plates, which were heated to 80° C., for 2.5 minutes to cure the adhesive layer. Thus, the laminate film similar to an IC card was formed.

Comparative Example 2 and Examples 1 to 10

An adhesive for producing an IC card and laminate film similar to an IC card were obtained in the same manner as in Comparative Example 1, except that the types and amounts of the first and second components of the two-component adhesives and the card configuration were changed as shown in Table 2.

[Measurement/Evaluation]

In the examples and the comparative examples, evaluation was performed by the tests described below. The results are shown in Table 2.

TABLE 2

| | | | Comp. Example 1 | Comp. Example 2 | Example 1 | Example 2 | Example 3 | Example 4 |
|---|---|---|---|---|---|---|---|---|
| Adhesive composition | First component | | A | A | A | A | A | A |
| | Second component | | B | C | G | H | E |
| | First component: Second component | (mass ratio) | 100:100 | 100:100 | 100:147 | 100:119 | 100:100 |
| | Polyisocyanate | (mass %) | 21.78 | 21.78 | 17.63 | 19.89 | 21.78 |
| | Polyetherpolyol (A) | | 5.72 | 5.72 | 4.63 | 5.22 | 5.72 |
| | Polyether polyol (B) | | 18.50 | 18.50 | 26.64 | 22.21 | 18.50 |
| | Polyether polyol (C) | | 11.50 | 11.50 | 8.6 | 10.18 | 11.50 |
| | Inorganic filler | | 42.50 | 42.50 | 42.5 | 42.5 | 42.50 |
| | Total | (mass %) | 100 | 100 | 100 | 100 | 100 |
| | Catalyst (A)/Organic tin | (parts by mass) | 0.005 | — | — | — | — |
| | Catalyst (B)/DABCO | | — | 0.05 | — | — | — |
| | Catalyst (C)/DBU | | — | — | 0.035 | 0.035 | — |
| | Catalyst (D)/DBU-C8 | | — | — | — | — | 0.05 |
| | Catalyst (E)/DBU-OH | | — | — | — | — | — |
| Adhesive properties | Curing time (40° C.) | (minutes) | 31 | 48 | 98 | 121 | 122 |
| | Curing time (80° C.) | | 2.0 | 2.8 | 2.5 | 2.2 | 2.2 |
| | Curing rate ratio (80° C./40° C.) | | 15.5 | 17.1 | 39.2 | 55.0 | 55.5 |
| | Hardness of cured product | | 69 | 70 | 50 | 61 | 69 |
| | Stable discharge time | (hours) | 1.5/X | 2.0/X | 8.6/○ | 10 or above/◎ | 10 or above/◎ |
| Card configuration | Thickness of skin film/each | (μm) | 100 | 100 | 100 | 150 | 100 | 100 |
| | Thickness of laminate film/total | (μm) | 760 | 770 | 770 | 760 | 750 | 750 |
| | Thickness of adhesive layer/each | (μm) | 230 | 235 | 235 | 180 | 225 | 225 |
| Card properties | Cutting properties | | ○ | Δ | ○ | ○ | ○ | ○ |
| | Bending resistance | | ○ | ○ | Δ/S | ○ | ○ | ○ |

| | | Example 5 | Example 6 | Example 7 | Example 8 | Example 9 | Example 10 |
|---|---|---|---|---|---|---|---|
| Adhesive composition | First component | A | A | A | A |
| | Second component | F | J | I | D |
| | First component: Second component | 100:100 | 100:46 | 100:63 | 100:100 |
| | Polyisocyanate | 21.78 | 29.77 | 26.68 | 21.78 |
| | Polyetherpolyol (A) | 5.72 | 7.82 | 7.01 | 5.72 |
| | Polyether polyol (B) | 18.50 | 2.85 | 8.91 | 18.5 |
| | Polyether polyol (C) | 11.50 | 17.06 | 14.9 | 11.5 |
| | Inorganic filler | 42.50 | 42.5 | 42.5 | 42.5 |
| | Total | 100 | 100 | 100 | 100 |
| | Catalyst (A)/Organic tin | — | — | — | — |
| | Catalyst (B)/DABCO | — | — | — | — |
| | Catalyst (C)/DBU | — | 0.035 | 0.035 | 0.035 |

TABLE 2-continued

|  |  |  |  |  |  |  |
|---|---|---|---|---|---|---|
| | Catalyst (D)/DBU-C8 | — | — | — | — | |
| | Catalyst (E)/DBU-OH | 0.035 | — | — | — | |
| Adhesive properties | Curing time (40° C.) | 134 | 145 | 141 | 136 | |
| | Curing time (80° C.) | 2.2 | 2.3 | 2.1 | 2.0 | |
| | Curing rate ratio (80° C./40° C.) | 60.9 | 63.0 | 67.1 | 68.0 | |
| | Hardness of cured product | 70 | 88 | 81 | 70 | |
| | Stable discharge time | 10 or above/⊚ | 10 or above/⊚ | 10 or above/⊚ | 10 or above/⊚ | |
| Card configuration | Thickness of skin film/each | 100 50 | 100 | 100 | 50 | 100 |
| | Thickness of laminate film/total | 760 760 | 770 | 780 | 770 | 760 |
| | Thickness of adhesive layer/each | 230 280 | 235 | 240 | 285 | 230 |
| Card properties | Cutting properties | ○ ○ | ○ | ○ | ○ | ○ |
| | Bending resistance | ○ Δ/H | Δ/H | ○ | ○ | ○ |

(1) Curing Time and Curing Rate Ratio (80° C./40° C.):

First, the time required for a torque to reach 1.0 kg·cm with the cure of the adhesive was measured at 40° C. and 80° C., respectively (curing time (40° C.) and curing time (80° C.)), using a Curastometer (produced by A&D Company, Ltd.) with a die configuration of the ISO 6502 flat plate die rotorless curemeter and an amplitude angle of ¼ degrees. A curing rate ratio (80° C./40° C.) of the curing time at 80° C. to the curing time at 40° C. was calculated.

(2) Stable Discharge Time:

The stable discharge time was evaluated as an index to determine whether an adhesive is capable of a long continuous application. A dispenser (type GD-1, produced by Shibahashi Corporation) was provided to a multiple-head nozzle (hole diameter: 5 mm, 8 holes), and the adhesives were discharged continuously at 800 g/min (100 g/min per hole). The time for the discharge amount to start decreasing or for gelled substances to appear in the discharged adhesive was measured as the stable discharge time. It was evaluated as "X" if the stable discharge time was shorter than 8 hours, "○" if the stable discharge time was 8 hours or longer and shorter than 10 hours, and "⊚" if the stable discharge time was 10 hours or longer.

(3) Hardness of Cured Product:

The Shore hardness D was measured in accordance with the Shore hardness test described in JIS K6253 using a commercially-available Shore hardness tester (produced by Teclock) at a temperature of 23° C.

(4) Cutting Properties:

The laminate film similar to an IC card was cut with a pair of scissors right after the laminate film was formed, and the cross section was visually evaluated. It was evaluated as "○" if the cured resin layer was sufficiently cured, and the cross section was not smashed by the cutting. It was evaluated as "A" if the cured resin layer was not sufficiently cured, and the cross section was rather smashed.

(5) Bending Resistance:

A tactile evaluation of the laminate film similar to an IC card was conducted at a temperature of 23° C. It was evaluated as "○" if the laminate film had an appropriate bending repulsion, "Δ/S" if the laminate film had a low bending repulsion and was easily bent, and "Δ/H" if the laminate film was rather hard and the cured resin layer had a possibility of being damaged when bent with a strong force.

(Evaluation Results)

The adhesives for producing an IC card according to Examples 1 to 10, which had a curing rate ratio (80° C./40° C.) of 30 or more, were stably discharged for 8 hours (the general operating time of a factory) or longer, and it was concluded that a long continuous application of the adhesives can be realized. That is, it was confirmed that the application device can be operated stably for production of an IC card over a long period of time, and that the maintenance performance of the application device would be improved. The adhesives for producing an IC card according to Examples 3 to 10 particularly showed excellent results, the adhesive compositions being stably discharged for 10 hours or longer.

For the adhesives for producing an IC card according to Comparative Examples 1 and 2, which had a curing rate ratio (80° C./40° C.) of less than 30, the adhesive compositions were stably discharged for only up to 2 hours, and a long continuous application was presumably difficult. Therefore, it was concluded that a long stable operation of an application device for production an IC card would be difficult, and that the application device would show a poor maintenance performance.

For the adhesives for producing an IC card according to Examples 1 to 10 and Comparative Example 1, for each of which the curing time at 80° C. is 2.7 minutes or shorter, the cured resin layers of the laminate films were sufficiently cured. The cross sections of the laminate films were not smashed, even when the laminate films were cut right after formation, and it was concluded that a card with a desired shape can be obtained. For the adhesives for producing an IC card according to Comparative Example 2, of which the curing time at 80° C. is longer than 2.7 minutes, the cured resin layer of the laminate film was not sufficiently cured, and the cross section of the laminate film was smashed when the laminate film was cut right after formation. Thus, it was concluded that a card of a desired shape cannot be obtained.

The adhesives for producing an IC card according to Examples 3 to 10 and Comparative Examples 1 and 2, of which the hardness of the cured product of 51 or more and 85 or less, exhibited an appropriate bending repulsion, and showed excellent results. Therefore, it was confirmed that damage to an IC module caused by bending or the like can be effectively prevented by producing an IC card in the same manner.

The adhesive for producing an IC card according to Example 1, of which the cured product has a hardness of 50, had a lower bending repulsion and was more easily bent compared to the adhesives for producing an IC card according to Examples 3 to 10. Note that the bending resistance can be improved by thickening the skin film, as shown in example 2. The adhesives for producing an IC card according to Examples 6 and 7, of which the cured product has a hardness of above 85, were harder compared to the adhesives for producing an IC card according to Examples 3 to 5, 9 and 10, and Comparative Examples 1 and 2. There were cases where the cured resin layer cracked when bent with a strong force. It was concluded that, although an IC card produced in the same manner can be practically used, measures such as adjustment of the skin film thickness or the like should be preferably taken.

INDUSTRIAL APPLICABILITY

With the adhesive and the process for producing an IC card according to the present invention, degradation and damage of an IC chip caused by a high temperature can be effectively prevented, and the adhesive can be applied continuously over a long period of time. Thus, the adhesive and the process can be suitably applied to the production of an IC card, in which an IC module having an IC chip and an antenna is mounted on a film.

The invention claimed is:

1. A process for producing an IC card comprising:
   an application/bonding step of providing an inlet film, on which a number of IC modules having an IC chip and an antenna are mounted, and a skin film for covering at least one surface of the inlet film, applying a two-component urethane adhesive having a curing rate ratio (80° C./40° C.) of 30 or more to the surface of the inlet film and/or the surface of the skin film, and bonding the inlet film and the skin film together to form a laminate film;
   a curing step of curing the applied adhesive to form a cured resin layer between the inlet film and the skin film of the laminate film; and
   a card forming step of dividing the laminate film for each IC module to obtain a number of IC cards,
   wherein the two component urethane adhesive comprises a first component having a polyisocyanate as a constituent component, and a second component having an active hydrogen compound and a catalyst as constituent components, and
   wherein the catalyst is selected from the group consisting of 1,8-diazabicyclo[5.4.0]undecene-7, octylate of 1,8-diazabicyclo[5.4.0]undecene-7, and 6-(2-hydroxypropyl)-1,8-diazabicyclo[5.4.0]undecene-7.

2. The process according to claim 1, wherein the application/bonding step is performed continuously by using a long film as the inlet film and as the skin film.

3. The process according to claim 2, wherein an adhesive having a curing time at 80° C. of 2.7 minutes or shorter is used as the adhesive.

4. The process according to claim 2, wherein the curing step is performed at a temperature of 60° C. to 100° C.

5. The process according to claim 2, wherein an adhesive having a Shore hardness D of 51 or more and 85 or less is used as the adhesive.

6. The process according claim 1, wherein an adhesive having a curing time at 80° C. of 2.7 minutes or shorter is used as the adhesive.

7. The process according to claim 6, wherein the curing step is performed at a temperature of 60° C. to 100° C.

8. The process according to claim 6, wherein an adhesive having a Shore hardness D of 51 or more and 85 or less is used as the adhesive.

9. The process according to claim 1, wherein the curing step is performed at a temperature of 60° C. to 100° C.

10. The process according to claim 1, wherein an adhesive having a Shore hardness D of 51 or more and 85 or less is used as the adhesive.

11. The process according to claim 1 wherein the inlet film and the skin film are bonded together by supplying the adhesive from a multiple-head nozzle so that the adhesive is applied in plural strips to a part of the surface of the inlet film and/or the skin film, laminating the inlet film and the skin film, and spreading the strips of the applied adhesive by pressing the films.

12. The process according to claim 1, wherein the inlet film and the skin film are bonded together by supplying the adhesive from a slit nozzle so that the adhesive is applied in one or more bands to a part of the surface of the inlet film and/or the skin film, laminating the inlet film and the skin film, and spreading the bands of the applied adhesive by pressing the films.

* * * * *